US012578968B2

(12) United States Patent
Goudarzi et al.

(10) Patent No.: US 12,578,968 B2
(45) Date of Patent: Mar. 17, 2026

(54) SYSTEMS AND METHODS FOR BRANCH PRE-RESOLUTION BY SOFTWARE-PROVIDED HARDWARE-MANAGED BACKSLICE EXECUTION

(71) Applicant: HUAWEI TECHNOLOGIES CO., LTD., Shenzhen (CN)

(72) Inventors: Maziar Goudarzi, Toronto (CA); Reza Azimi, Aurora (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 18/239,490

(22) Filed: Aug. 29, 2023

(65) Prior Publication Data

US 2025/0077235 A1     Mar. 6, 2025

(51) Int. Cl.
*G06F 9/38* (2018.01)

(52) U.S. Cl.
CPC .................................. *G06F 9/3844* (2013.01)

(58) Field of Classification Search
CPC ...................................................... G06F 9/3844
See application file for complete search history.

(56) References Cited

U.S. PATENT DOCUMENTS

2021/0326139 A1* 10/2021 Gupta ................... G06F 9/3861
2023/0297381 A1* 9/2023 Keltcher ............... G06F 9/3844
                                                                          712/240
2023/0315476 A1  10/2023 Goudarzi

OTHER PUBLICATIONS

Branch Runahead: An Alternative to Branch Prediction for Impossible to Predict Branches, (UT Austin, MICRO'21), Oct. 18-22, 2021.
Simultaneous Subordinate Microthreading (SSMT) (R. Chappel et al., ISCA'99), 1999.
Execution-based Prediction Using Speculative Slices (UofWisconsin-Madison, ISCA'01), Jul. 2001.
Slipstream Processors Revisited: Exploiting Branch Sets (V. Srinivasan et al., ISCA '20), 2020.
Difficult-Path Branch Prediction Using Subordinate Microthreads (Chappell et al.) Conference: Computer Architecture, 2002. Proceedings. 29th Annual International Symposium on . . . .
Store-Load-Branch (SLB) Predictor: A Compiler Assisted Branch Prediction for Data Dependent Branches (M.U. Farooq et al., HPCA'13), 2013.
Load Driven Branch Predictor (LDBP) (A. Sridhar et al., UCSC, arXiv 2020).

* cited by examiner

*Primary Examiner* — Zachary K Huson

(57) ABSTRACT

Apparatus, systems, and methods for branch pre-resolution by software-provided hardware-managed backslice execution may be provided. According to an aspect, a method may be provided. The method may include receiving a plurality of instructions. The method may further include identifying a load-dependent branch (LDB) from the plurality of instructions. The method may further include generating a sequence of instructions associated with the LDB, the sequence of instructions being sufficient to either produce or predict a branch outcome of the LDB. The method may further include identifying a program counter (PC) of the LDB.

17 Claims, 13 Drawing Sheets

400

```
for(int i=0; i<4; i++) {
  int a = A[i];
  if ( B[ a ] == C ) { // A load-dependent branch
    f(i);
  }
}
```

102

| Prediction Queues 206 | | | | Chain Live-in Register Access | Dependence Chain Engine 204 | Affector/Guard Detection |
|---|---|---|---|---|---|---|
| Fetch | Decode | Rename | Reservation Stations | Physical Register Read | Execute | Chain Extraction 202 |
| | | | | | | Retire |

```
for(int i=0; i<4; i++) {
    ...                                902
    if( i%3 ) continue;
    int a= A[i];
    if ( B[a]==C ) { // Target branch
        g();
    }
904    ...
}
```

```
for(int i=0; i<4; i++) {
    ...                              916
    A[i]=0;
    if( i%3 ) continue;              912
    int a= A[i];
    if ( B[a]==C ) { // Target branch
        g();
    }
914    ...
}
```

```
for(int j=0; j<N; j++) {
    for(int i=0; i<4; i++) {
        ...
        if( K[i] ) break;                    1002
        int a= A[i];
1004    if ( B[a]==C ) { // Target branch
            g();
        }
        ...
    }
}
```

1201. Receiving a plurality of instructions.

1202. identifying a load-dependent branch (LDB) from the plurality of instructions.

1203. Generating a sequence of instructions associated with the LDB, the sequence of instructions being sufficient to either produce or predict a branch outcome of the LDB.

1204. Identifying a program counter (PC) of the LDB

1300

1301. Receiving a sequence of instructions associated with a load-dependent branch (LDB), the sequence of instructions being sufficient to either produce or predict a branch outcome of the LDB.

1302. Executing the sequence of instructions to produce a branch outcome; and

1303. Storing the branch outcome in a branch outcome table.

SYSTEMS AND METHODS FOR BRANCH PRE-RESOLUTION BY SOFTWARE-PROVIDED HARDWARE-MANAGED BACKSLICE EXECUTION

CROSS-REFERENCE TO RELATED APPLICATIONS

This is the first application filed for the present invention.

FIELD OF THE INVENTION

The present invention pertains to high performance computing, and in particular to systems and methods for branch pre-resolution by software-provided hardware-managed backslice execution.

BACKGROUND

Branch prediction plays a crucial role in modern computer systems, enabling efficient instruction execution by anticipating the outcomes of conditional branches. However, accurately predicting the behavior of hard-to-predict branches presents challenges. Hard-to-predict branches refer to those with dynamic and unpredictable outcomes influenced by runtime conditions, user inputs, and complex program structures. Existing solutions for dealing with such branches face limitations in terms of latency, correctness, and the cost of mispredictions among others. Latency becomes an issue when prediction mechanisms introduce delays, potentially stalling the processor's pipeline and negatively impacting performance. Balancing the trade-off between prediction accuracy, complexity, and latency, remains a significant challenge in effectively addressing hard-to-predict branches.

Therefore, there is a need for systems and methods for branch pre-resolution by software-provided hardware-managed backslice execution that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Apparatus, systems, and methods for branch pre-resolution by software-provided hardware-managed backslice execution may be provided. According to an aspect, a method performed by a compiler may be provided. The method may include receiving a plurality of instructions. The method may further include identifying a load-dependent branch (LDB) from the plurality of instructions. The method may further include generating a sequence of instructions associated with the LDB, the sequence of instructions being sufficient to either produce or predict a branch outcome of the LDB. The method may further include identifying a program counter (PC) of the LDB.

According to another aspect, a method of performing branch prediction in a processor may be provided. The method may include receiving a sequence of instructions associated with a load dependent branch (LDB). The sequence of instructions may be sufficient to either produce or predict a branch outcome of the LDB. The method may further include executing the sequence of instructions to produce a branch outcome. The method may further include storing the branch outcome in a branch outcome table.

The method may further include receiving execution limits of the sequence of instructions. Executing the sequence of instructions to produce a branch outcome may include executing the sequence of instructions based on the execution limits to produce a plurality of branch outcomes. One of the plurality of branch outcomes may be produced each time the sequence of instructions is executed. Storing the branch outcome in a branch outcome table may include storing the plurality of branch outcomes in the branch outcome table.

The method may further include executing a plurality of instructions, the plurality of instructions including the LDB. The method may further include receiving an indication that the LDB will be executed, the indication being received sufficiently in advance of the execution of the LDB to allow the execution of the sequence of instructions. Executing of the sequence of instructions may be initiated in response to receiving the indication.

The method may further include receiving a program counter (PC) of the LDB. The method may further include executing a plurality of instructions, the plurality of instructions including the LDB. The method may further include monitoring the execution of the plurality of instructions being executed by the processor to detect the execution of the LDB as indicated by the PC. The method may further include executing the LDB.

Executing the LDB may include determining whether to utilize one of the plurality of branch outcomes or to utilize the output of a branch prediction unit. Executing the LDB may include determining to use the one of the plurality of branch outcomes. The one of the plurality of branch outcomes is when executing the LDB based on a history of mispredictions of the branch prediction unit.

Executing the LDB may include determining to use the branch prediction unit when executing the LDB. The LDB is part of a loop of the plurality of instructions and the execution limits include limits of the loop.

According to an aspect, a processor may be provided. The processor may include a core configured to execute a plurality of instructions. The processor may further include a backslice configuration table (BCT) configured to store an input register value of a branch outcome of a load-dependent branch (LDB). The processor may include a producer side unit configured to supply the core with a backslice to be executed by the core. The backslice may be derived from the LDB and supplied to the core prior to execution of the LDB. The producer side unit may further be configured to receive the branch outcome of the LDB produced by the core executing the backslice. The processor may further include a consumer side unit configured to monitor execution of the LDB associated with the backslice. The processor may further include a branch direction prediction unit configured to supply to the core, the branch outcome.

The core may include a branch prediction unit. The branch direction prediction unit may further be configured to receive a branch prediction and be configured to supply the core with the branch prediction or the branch outcome. The input register value may be used in the execution of the backslice by the core.

The producer side unit may include a backslice issue unit configured to supply the core with the backslice. The producer side unit may further include a branch outcomes table configured to receive the branch outcome of the LDB produced by the core. The producer side unit may further include a branch resolution unit configured to determine if the branch outcome is supplied to the core or a branch prediction of a branch prediction unit of the core should be supplied to the core.

The consumer side unit may include a branch monitoring unit configured to monitor execution of the LDB associated with the backslice. The consumer side unit may further include a branch status table configured to store a status of the LDB. The status may include one of a fetch status, a squash status, and a commit status.

The backslice may be associated with a loop included in the plurality of instructions. The producer side unit may further be configured to supply the processor core with a value of a loop counter of the loop. The producer side unit may further be configured to store the values of the loop counters associated with each of the plurality of branch outcomes. Each execution of the backslice may correspond to an iteration of the loop.

The backslice may be associated with a loop included in the plurality of instructions. The consumer side unit may further be configured to monitor an iteration number of the execution of the LDB such that for each fetch of the LDB the iteration number is incremented, for each squash of the LDB the iteration number is decremented, and for each commit of the LDB the iteration number the branch outcome is removed from a branch outcome table of the producer side unit.

According to another aspect, an apparatus may be provided. The apparatus includes modules or electronics configured to perform one or more of the methods and systems described herein.

According to one aspect, an apparatus may be provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium may be provided, where the computer readable medium stores program code executed by a device and the program code is used to perform one or more of the methods and systems described herein.

According to one aspect, a chip may be provided, where the chip includes a processor and a data interface, and the processor reads, by using the data interface, an instruction stored in a memory, to perform one or more of the methods and systems described herein. Aspects may further include the memory.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 illustrates changes in pipeline stages under full-hardware mechanism category.

FIG. 9A illustrates a code including a "continue" statement, according to an aspect.

FIG. 9B illustrates a loop-iteration-indicator-PC, according to an aspect.

FIG. 10 illustrates a code including a "break" statement, according to an aspect.

It will be noted that throughout the appended drawings, like features are identified by like reference numerals.

DETAILED DESCRIPTION

Apparatus, systems, and methods for branch pre-resolution by software-provided hardware-managed backslice execution may be provided. According to an aspect, a method 1200 may be provided. The method 1200 may include receiving 1201 a plurality of instructions. The method may further include identifying 1202 a load-dependent branch (LDB) from the plurality of instructions. The method may further include generating 1203 a sequence of instructions associated with the LDB, the sequence of instructions being sufficient to either produce or predict a branch outcome of the LDB. The method may further include identifying 1204 a program counter (PC) of the LDB.

According to another aspect, a method of performing branch prediction in a processor may be provided. The method 1300 may include receiving 1301 a sequence of instructions associated with a load dependent branch (LDB). The sequence of instructions may be sufficient to either produce or predict a branch outcome of the LDB. The method may further include executing 1302 the sequence of instructions to produce a branch outcome. The method may further include storing 1303 the branch outcome in a branch outcome table.

According to another aspect, a processor 1400 may be provided. The processor 1400 may include a core 1402 configured to execute a plurality of instructions. The processor may further include a backslice configuration table (BCT) 1404 (similar to BCT 710) configured to store an input register value of a branch outcome of a load-dependent branch (LDB). The processor may further include a producer side unit 1406 (similar to producer side 716) configured to supply the core with a backslice to be executed by the core. The backslice may be derived from the LDB and supplied to the core prior to execution of the LDB. The producer side unit 1406 may further be configured to receive the branch outcome of the LDB produced by the core executing the backslice. The processor may further include a consumer side unit 1408 (similar to consumer side 724) configured to monitor execution of the LDB associated with the backslice. The processor may further include a branch direction prediction unit 1410 configured to supply to the core, the branch outcome.

Branch-prediction is crucial to keeping the processor pipeline healthily fed with new instructions. Existing techniques for branch-prediction rely on history-based mechanisms. However, many hard-to-predict branches (HPB) including, but not limited to, load-dependent branches (LDB) in modern workloads exhibit little historical behavior, and hence, conventional methods perform poorly on the HPB. This limitation is a common observation on modern processors.

Figure 1:
FIG. 1 illustrates a load-dependent branch.

Many branches in modern workloads, such as load-dependent branches (as illustrated in FIG. 1) are hard to predict. FIG. 1 illustrates a load-dependent branch 102. These HPB often do not show historical repetitions, neither locally (with respect to the same branch) nor globally (with respect to other branches).

Load-dependent branches may take even longer to resolve if they combine with long-latency misses (i.e., misses in L2 and L3 caches). As may be appreciated, cache misses occur when the data needed for an operation is not found in the cache memory and needs to be fetched from a slower level of memory, such as the L2 or L3 cache. These cache levels typically have higher access latency compared to the faster L1 cache. When a load-dependent branch instruction encounters a cache miss, it needs to wait for the required data to be fetched from the slower cache level or main memory before it can determine the branch outcome and continue execution. This additional latency introduced by cache misses can further delay the resolution of load-dependent branches, potentially impacting the overall performance of the program or system.

Hard-to-predict branches appear in many important benchmarks, and the corresponding mis-prediction rates (ratio of mis-predictions vs. number of executions of the branch) are very high (10% and more). This inefficiency is universally observed in processors by vendors including intel, HiSilicon, and others.

Existing solutions for dealing with HPB generally fall under two general categories: full-hardware mechanisms and assist-thread mechanisms.

The solutions under the full-hardware mechanism category try to construct the branch-outcome formula (i.e., the sequence of instructions that compute the condition tested by the branch instruction) all in hardware (HW) by monitoring and back-tracking the chain of instructions (so called the dependence-chain) leading to the branch instruction in an identified loop. These solutions, then, try to repeat that chain for subsequent iterations of the enclosing loop.

FIG. 2 illustrates changes in pipeline stages under full-hardware mechanism category. FIG. 2 shows a brief overview of the changes required to the processor pipeline. The "Chain Extraction" box 202 at the Retire stage tries to identify the formula for branch-outcome computation. If successful, the "Dependence Chain Engine" 204 at the Execute stage tries to pre-execute the formula for forthcoming instances of the target branch and produces branch-outcomes that would be consumed by the "Prediction Queues" 206 at the Fetch stage.

Figure 3:
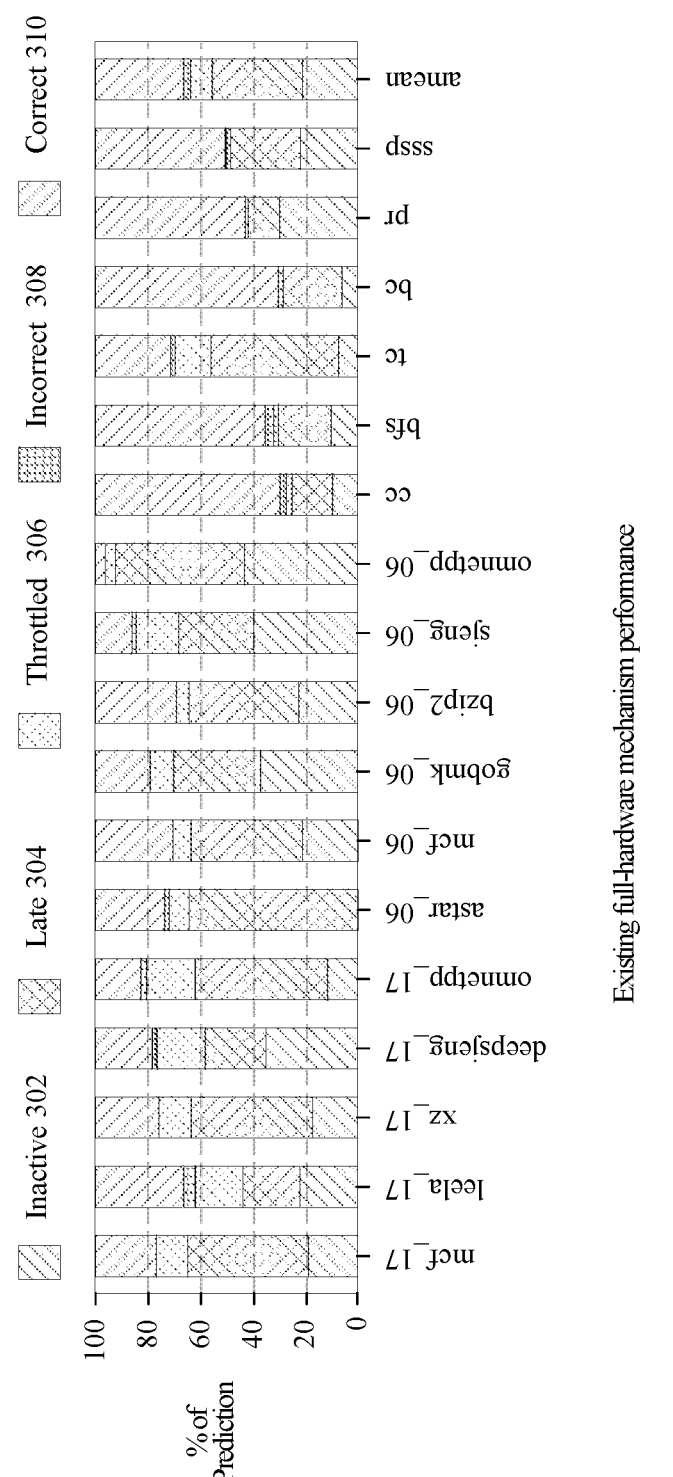
FIG. 3 illustrates breakdown of lost and made predictions by existing full-hardware mechanisms.

The full-hardware mechanism category has limitation and weaknesses. The formula-detection by hardware inherently suffers from latency and correctness issues. Regarding latency limitation, identifying the branch-outcome formula takes some time (retiring of one instance of the branch instruction at the very least) for the hardware. By that time, more instances of the target branch may have already got fetched, which would be too late to pre-compute the branch-outcome for these instances. The bars 310, in bar graph 300 of FIG. 3, show such inactive (no chain yet identified) cases. Even after identification, producing the branch-outcomes for subsequent iterations of the loop may take some time. Thus, again the outcomes could be late. The bars 304 in bar graph 300 show such late cases. FIG. 3 illustrates breakdown of lost and made predictions by existing full-hardware mechanisms. Graph 300 shows the % or portion of predictions that are inactive 302, late 304, throttled 306, incorrect 308 and correct 310.

Regarding correctness limitation of full-hardware mechanism category, various issues could mislead the hardware in formula identification, or in the validity of the input values put into the formula.

The assist-thread mechanisms category of solutions tries to produce a (potentially stripped-down) copy of the main thread, called an assist-thread, and let it run ahead of the main thread to pre-compute the branch-outcomes and pass them on to the main thread. In existing solutions, the assist thread could be generated by the software/compiler or inferred by the hardware during execution.

Figure 4:
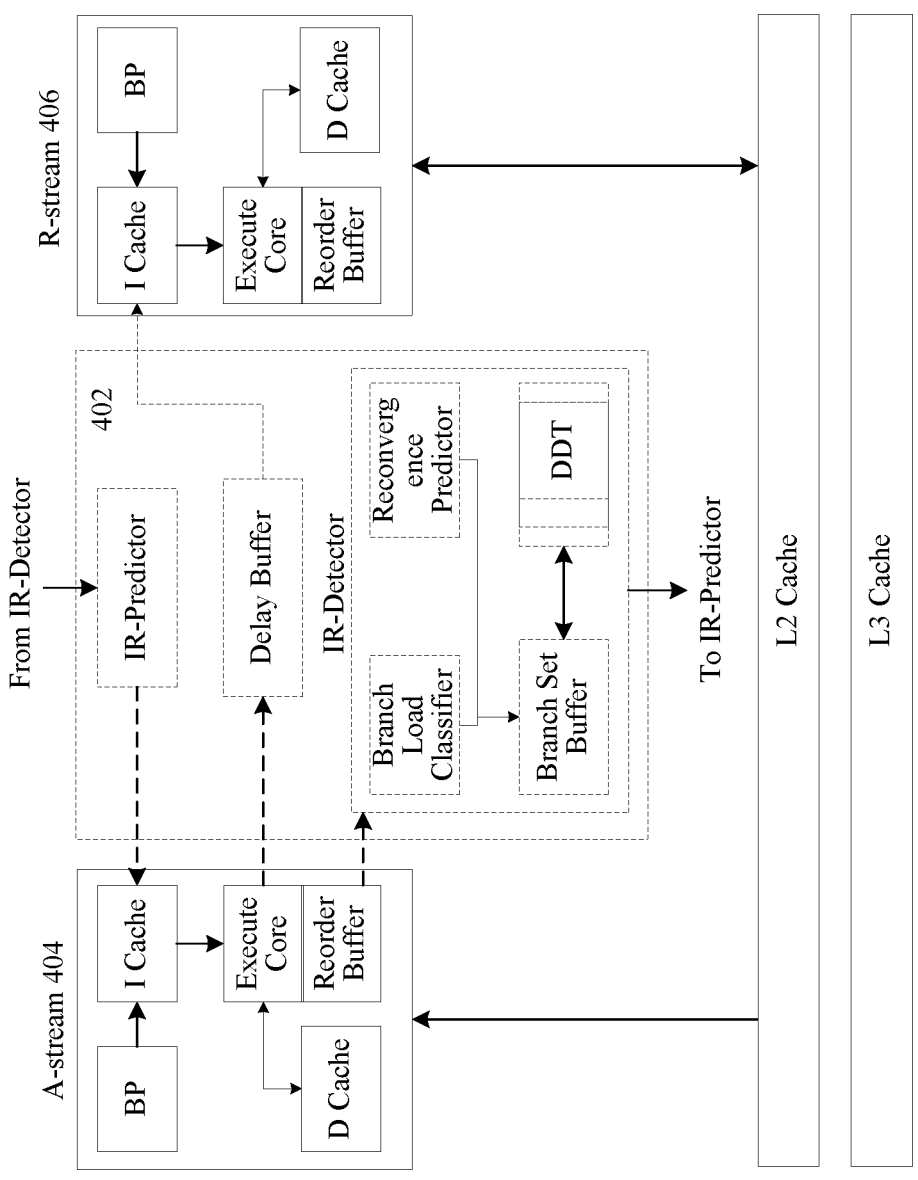
FIG. 4 illustrates an assist-thread mechanism.

FIG. 4 illustrates an assist-thread mechanism. The mechanisms in box 402 try to infer the assist thread on the fly, and then let it run ahead for prefetching as well as branch resolution. The A-stream (advance-stream) 404 is the assist-thread that helps R-stream (redundant-stream) 406 which is the main thread.

Similar to the full-hardware mechanism category solutions, the assist-thread mechanism (the approaches that try to infer the assist-thread in hardware) suffer from latency and correctness issues. There are other approaches that try to use a compiler/software to provide the assist-thread offline, but they do not have the flexibility of choosing whether to engage the mechanism or not. Such approaches always run the assist-thread, whereas, in some cases, the conventional predictors work fine, and thus, the assist-thread execution may be a waste.

According to aspect, the problem of predicting the Taken or Not-taken (T/NT) outcome of hard-to-predict branches may be solved. According to an aspect, the prediction accuracy for these branches may be improved; i.e., reduce the $$\text{mis-prediction ratio}\left( = \frac{\text{number of mis-predictions}}{\text{total number of predictions}} \right)$$

of hard-to-predict branches.

According to an aspect, the branch-outcome may be pre-computed by a collaborative SW and HW scheme in advance, so that conventional prediction mechanism is no longer needed for the target branch. In this collaborative scheme, the compiler/software may provide the formula (i.e., the sequence of instructions) to compute the branch-outcome. This formula is passed to hardware, and then the hardware selectively runs the formula earlier to pre-compute the branch-outcome.

Since the formula is provided offline (e.g., at compile-time) by software/compiler, the latency and correctness concerns of full-hardware mechanisms are mitigated or reduced. Moreover, since the hardware decides whether or not to engage the mechanism, the shortcomings of the assist-thread mechanisms may also be addressed.

Figure 5:
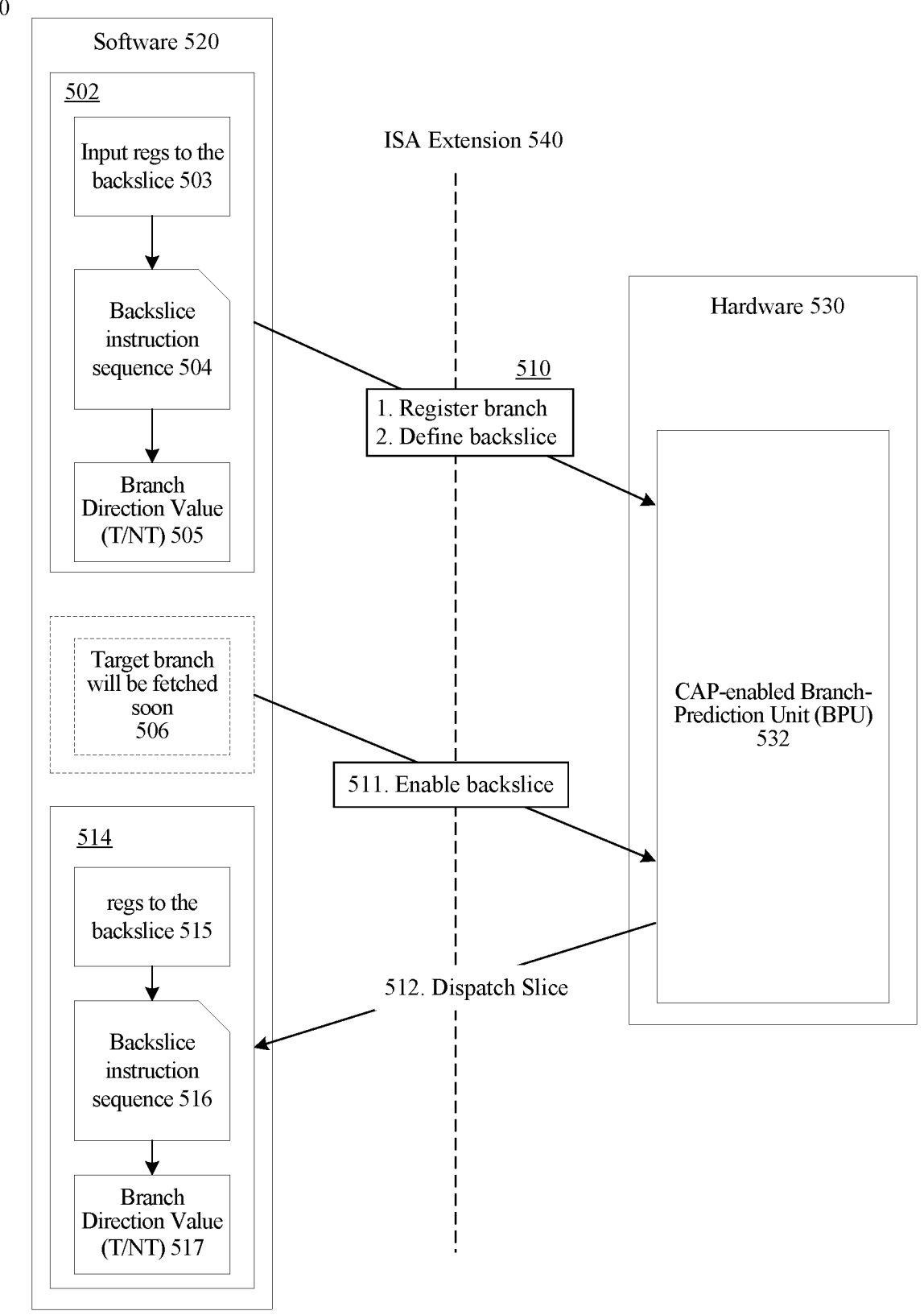
FIG. 5 illustrates a method according to an aspect.

FIG. 5 illustrates a method according to an aspect. FIG. 5 shows a sequence diagram view of one or both of available information and operations performed in software. According to an aspect, the method 500 includes, at box 502, the software 520 (by a programmer manually) or a compiler automatically) may identify the formula to compute the branch outcome. This formula (or compute instructions) may comprise a sequence of instructions that end in computing the Taken or Not-taken binary outcome 505 of the branch. This is called "backslice" 504 as illustrated. Identifying the backslice may further include identifying the input regs 503 to the backslice, e.g., the registers or constants that feed the backslice. In some aspects, identifying the compute formula may involve identifying an associate loop, including a starting point of the loop, an end point of the loop and an increment of the loop. The software 520 may further identify the target branch (e.g., the hard to predict branch) that is to is to be communicated to the HW 530.

The method 500 may further include performing 510 SW-to-HW communication for registering identified information at box 502 via the instruction set architecture (ISA) extension 540. For example, the method may include, at 510, performing registration operation by registering the branch (e.g., the target branch) with the hardware 530 and defining the backslice at the hardware 530 via the ISA extension 540. This called registration operation. In addition, the program counter (PC) of the target branch may also be communicated with the HW so that it knows for which branch to engage this backslice if at all.

The operations related to registering the target branch and defining the backslice via the ISA extension may be done early in program execution.

In some aspects, method 500 may further include the software 520 (by the programmer or compiler) knowing or determining, at 506 from static analysis that the target branch will be part of the forthcoming instructions. Accordingly, the software 520 may notify, via the ISA extension 540, the hardware 530 early enough that soon the target branch will be reached, thereby enabling 511 the backslice. Thus, the software (via the programmer or compiler) may indicate to HW 530 that a target branch associated with the previously sent formula (backslice)—further indicating to HW 530 to begin running the slices under the hood. Operations related to enabling the backslice may be understood as additional software that is produced by the programmer or compiler and that information is passed to the HW to improve HW operations.

Notifying the hardware 530 that the target branch will be fetched soon gives some slack to the hardware 530 for pre-execution. The input values (e.g., regs to the backslice 515) for the backslice may be captured at this time by the hardware engine 530. In some aspects, this activation operation, referring to enabling the backslice, can be left to the hardware 530 to decide (HW may not need the target branch indication from SW). For example, HW can monitor the PC of the addresses of the instructions that are being executed, and whenever HW observes a specific branch then it can start to execute for future iteration of that branch.

The HW engine 530 may include a compiler-assisted pre-execute (CAP) enabled branch-prediction unit (BPU) 532 which may keep track of the target branch and may decide to engage the pre-execute mechanism if high mis-predictions are observed on that branch. The CAP-enabled BPU 532 may be in addition to branch prediction component of HW 530. The CAP-enabled BPU 532 may perform one or more operations including: receiving instructions to register the target branch; receiving formula for computing the branch outcome; in cases where a loop is involved, receiving the values of associated loop counter and loop bounds. The CAP-enabled BPU 532 may further run the compute formula and determine the branch outcome under the hood. In some aspects, the CAP-enabled BPU 532 may dispatch sequences of instructions (e.g., slices) to compute the formula for determining branch outcomes. In some embodiment, each sequence of the instruction may be based on one value of the loop counter.

According to an aspect, method 500 may further include, HW 530 dispatching 512 the backslice sequence of instructions for execution to produce the branch-outcome. The dispatching of slices may be done through the ISA extension 540. The dispatched slices may be instructions (e.g., generated software) that is passed for execution. The backslice may need some input values for the registers it has as its primary inputs. These values may be captured as regs to the backslice 511 to enable the backslice. In some aspects, this enabling of the backslice may be left for the HW. The HW may monitor the PC of the addresses of the instructions that are being executed, and whenever HW observes a specific branch then it can start to execute for future iteration of that branch.

In some aspects, the backslice may be disabled. For example, the software 520 may send indicate to HW that the code region involving the target-branch is finished, so any resources booked for the backslice could be released. Thus, the HW 530 may receive further instructions indicating release of resources associated with a region of the code involving the target branch.

According to an aspect, when software 520 receives the dispatches slices, software may perform one or more operations 514. For example, software 520 may compute the backslice instruction sequence 516 based on received sequence of instructions (dispatched slices). The backslice instruction sequence 516 may refer to one instance of the backslice, which needs to be executed on the processor core. In some embodiments, e.g., in the case of a loop, each slice may correspond to one value of a loop counter. The computation of the backslice may further based on one or more other inputs 515, e.g., address of the arrays that are being accessed. Each backslice (or instance of backslice) may be computed and a branch outcome 517 (branch direction value (T/NT)) may be determined.

In some aspects, method 500 may include a register phase initiated by software 520. In the register phase, the software (compiler) role may include one or more of: identifying the target loop nests (or the target branch), identifying load dependent branches, generating code for backslices (i.e., branch-outcome formula), and instrumenting the Loop Nest. Instrumenting the Loop Nest means adding the necessary instructions to the loop(s) to 'register' the backslice with the hardware. Method 500 may further include a pre-execute phase initiated by the hardware 530. In the pre-execute phase, the hardware 530 roles may include one or more of: dispatching the branch backslice for future iterations of the loop (in the case of a loop); recording and using the slice outputs as the branch outcome; and tracking progress and adjusting the depth of pre-execution according to the consumption rate.

In the general case, the hard-to-predict branch may be anywhere in the program (not necessarily in a loop, which is described elsewhere herein).

Figure 6:
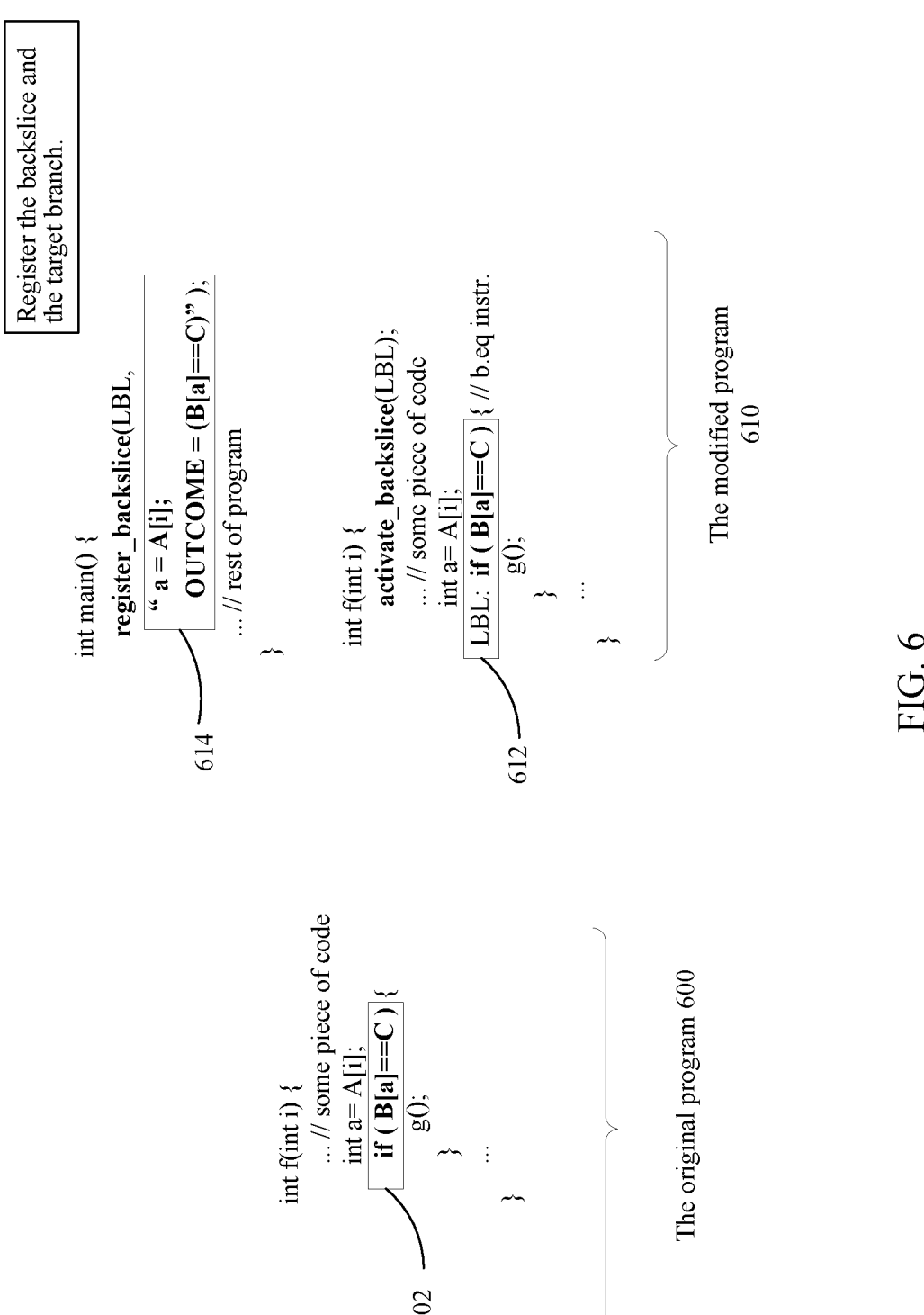
FIG. 6 illustrates an example of a hard-to-predict branch in a non-loop case, according to an aspect.

FIG. 6 illustrates an example of a hard-to-predict branch in a non-loop case, according to an aspect. The original program 600 includes a function, in which, the hard-to-predict branch 602 exists as illustrated. The formula for computing the branch outcome can be summarized as the portion 614 of the modified program.

According to an aspect, the original program 600 may be modified to the modified program 610 when passing to HW 530. As illustrated in the modified program 610, the target branch (the hard-to-predict branch) is eventually a conditional branch instruction (e.g. the "b.eq" instruction) designated by a label LBL 612.

According to an aspect, one or more registration operations may be performed. The software/compiler 502 may designate the backslice formula and the target-branch to the hardware 530 through a SW/HW interface mechanism (e.g., ISA extension 540) to register the backslice and the target branch. The SW/HW interface mechanism may be any appropriate mechanism to perform the necessary functions (including communication between the software/compiler 502 and the hardware 530). In an embodiment, the SW/HW may be implemented via passing two PC values to the HW: one PC corresponding to LBL 612, and another PC corresponding to the start address of the backslice code that is put separately in some section of memory. According to an aspect, the registration operation may be done only once per target branch in the program.

According to an aspect, the one or more registration operations may be represented by a registration function, e.g., register_backslice(BrPC, codeToComputeOutcome). The BrPC argument or parameter may be the PC of the branch-instruction of interest. The LBL label may represent the PC of the branch instruction corresponding to the designated if statement. The codeToComputeOutcome argument or parameter may be the sequence of instructions that leads to computing the branch-outcome corresponding to a given iteration of the loop. According to an aspect, the registration function, register_backslice(BrPC, codeToComputeOutcome), may represent the one or more registration operations described, regardless of how the one or more registration operations may be implemented. In some aspects, the one or more registration operations may be done once, e.g., at the beginning of the program.

In some aspects, one or more activation operations may be performed. For example, an optional activation operation may be done in software, by using another SW/HW interface. The LBL label can unambiguously identify the desired backslice, and hence, may be the only information to pass to the HW.

As an alternative to activate-by-software, the hardware 530 may perform the job (e.g., perform one or more activation operations) under the hood by a multitude of ways. For example, the hardware 530 may monitor the fetch of an earlier PC such as the start of the enclosing function, or another activation-PC passed to it via same described one or more registration operations.

According to an aspect, the one or more activation operations may be represented by an activation function: activate-_backslice(BrPC). The BrPC argument or parameter may refer to the PC of the branch-instruction of interest.

According to an aspect, the activation function, activate-_backslice(BrPC), may represent the one or more activation operations described, regardless of how the one or more activation operations may be implemented.

Figure 7:
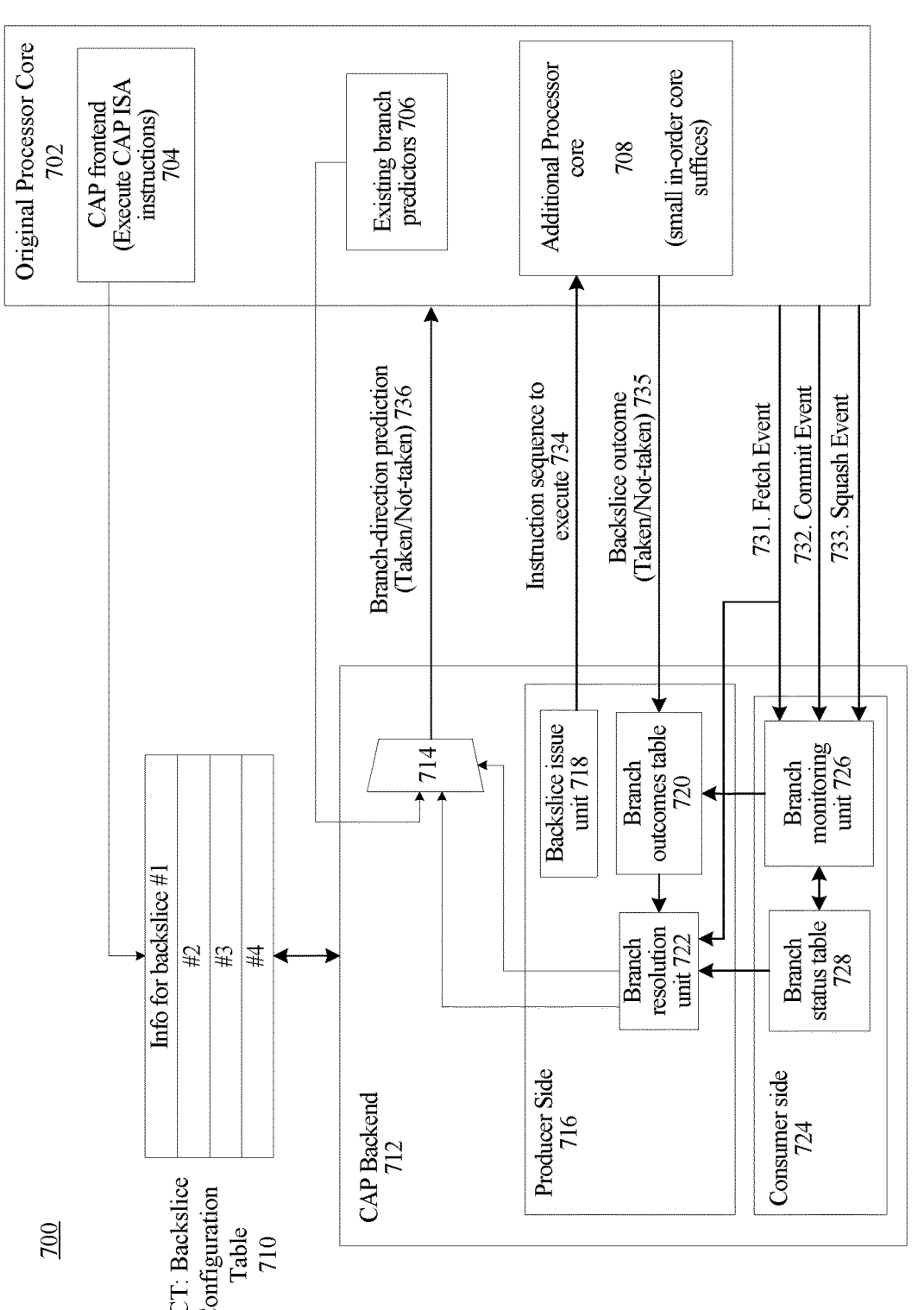
FIG. 7 illustrates a block diagram of hardware components, according to an aspect.

FIG. 7 illustrates a block diagram of hardware components, according to an aspect. Hardware 700 may be similar to hardware 530. In an embodiment, the HW 700 may comprise the original processor core 702, the backslice configuration table (BCT) 710 and the CAP backend 712 as illustrated. The original processor core 702 may further comprise a CAP frontend 704, which may be responsible for the SW/HW interface (e.g., ISA extension 540). According to an aspect, the CAP frontend 704 in relation to the BCT 710 may perform, in reference to FIG. 5, operations 510 related to registering the branch and defining the backslice. The registration and activation operations described herein may be executed at or by the CAP frontend 704. The registration and activation operations can be a re-purposed ordinary instructions of the processor (e.g. ordinary store operations to special-purpose regions of memory), or brand new instructions added to the ISA. The CAP frontend 704 may execute CAP ISA instructions. The CAP frontend 704 may obtain the loop and backslice information from SW via ISA as described in reference to FIG. 5. The CAP frontend 704 may allow saving or restoring upon context-switch. Context-switch may refer to when the operating system (OS) switches the process that is being run on the core, for example, from process P1 to process P2. Since the backslice information may be private or specific to each process, when the processor switches to P2, the backslice information of P1 (if any) could be saved, and that of P2 (again, if any), could be restored.

The BCT 710 may be an interface between the CAP frontend 704 and the CAP backend 712. The BCT 710 may store and manage information on each backslice as part of uArch state. The information of each back slice may include, but is not limited to, one or more of: the starting address of the backslice in memory, the number of instructions in the backslice, a list of primary-input registers to the backslice, and the PC of the target branch. Thus, the BCT 710 may comprise, per backslice, one or more of: target-branch PCs, sequence of instructions of the slice, values for the invariant input registers of the backslice, range of values (initial-value and the increment) for the induction variable used in the backslice. The BCT 710 may be accessible by the CAP backend 712 and its components.

The CAP backend 712 may comprise a multiplexer 714 which may override the prediction by conventional branch-predictors (e.g., existing branch predictor 706) if, for example, the branch resolution unit 722 is providing a branch-outcome. The multiplexer 714 may receive input from the branch resolution unit 722 and the existing branch predictors 706, and generate a branch-direction (taken/not taken) 736 based on the received input.

This overriding is reasonable because in principle, the one or more operations performed are pre-execute operations, and not a prediction, of the branch. Thus, the outcome obtained is expected to be correct.

According to an aspect, the CAP backend 712 may comprise a producer side 716 and a consumer side 724. The producer side 716 may produce and manage the branch-outcomes. The producer side 716 may schedule and issue backslices. The producer side 716 may further run (or monitor running of) backslices. The producer side 716 may further keep track of produced branch-outcomes. The producer side 716 may further feed the produced branch-outcomes to the branch prediction unit (BPU) at proper time. The producer side 716 may further keep the backend in sync with the software progress.

The consumer side 724 may monitor and manage the consumption of the branch-outcome by the original processor core 702 (or the additional processor core 708) when fetching the target branch 731. Thus, the consumer side 724 may keep track of software execution, by monitoring fetch 731, commit 732, and squash 733 of target branches.

According to an aspect, the producer side 716 may comprise one or more of: backslice issue unit 718, branch outcomes table 720, and a branch resolution unit 722. The backslice issue unit 718 may decide which backslice (or which iteration of which backslice) to issue (instruction sequence to execute 734) for execution. The instruction sequence to execute 734 may refer to the dispatches slices 512. The backslice issue unit 718 may issue instruction sequence to execute 734 to the additional processor core 708. There may be multiple backslices active at the same time, thus such management may be performed by the backslice issue unit 718. In some embodiments, the backslice issue unit 718 may skip some iterations if software is too ahead. In some embodiments, the backslice issue unit 718 may stall issuance if hardware is too ahead, or when no space is left on the branch-status table 728.

The additional processor core 708 may be a part of or additional to the original processor core 702. The additional processor core 708 may represent any kind of processor core, or even other reconfigurable HW, such as Coarse-Grained Reconfigurable Array (CGRA) or Field-Programmable Gate Array (FPGA), that can execute the backslice. The original host processor may be a first or simplest choice, but other implementations such as simultaneous multi-threading (SMT) threads, small in-order cores and the like, may be used. The Additional processor core 708 may execute each issued backslice (issued instruction sequence 734) and provide the backslice outcomes (taken/not taken) to the branch outcome table 720.

The branch-outcomes table 720 may store the computed branch-outcomes after the execution of each issued back-slice is finished on label 7. The branch-outcome table may store, per backslice, pairs of <iteration-number, branch outcome (T/NT)>. The branch-outcome table may add entry upon finishing execution of a backslice and remove entry upon commit of a target-branch instance.

The branch resolution unit 722 may be responsible to check if the branch outcome table 720 has a branch-outcome pre-computed when an instance of the target branch (e.g., fetch event 731) is observed by the fetch unit of the host processor. The branch resolution unit may receive input from the branch status table, the fetched event 731 and the branch outcome table. For each fetch event 731, the branch resolution unit 722 may search the branch outcome table 720 (e.g., perform a CAM-search branch outcomes table) to determine if a match exists (e.g., a branch outcome pre-computed for said each fetch event (e.g., an instance of the target branch), the branch resolution unit 722 may send matched outcome to the processor core 702 via the multi-plexer 714.

The consumer side 724 may comprise one or more of branching monitoring unit 726 and branch status table 728. The dynamic instances of the target branch could incur one of three events: they get fetched 731, afterwards they may get committed 732, or may get squashed 733 due to mis-prediction of an earlier other branch. The branch monitoring unit 726 may be responsible for monitoring these three events on all registered branches. The branch monitoring unit 726 may further track the status of the three events via the branch status table 728. The branch status table 728 may include, per backslice, iteration-number on the software (consumer) side. For each monitored fetch event, the iteration number may be incremented. For each monitored squash event, the iteration number may be decremented.

According to an aspect, the consumer side 724, via the branch monitoring unit 726 may monitor one or more of, fetch event, 731, commit event 732 and squash event 733. For each fetch event 731, the branch monitoring unit 726 may monitor each fetched instruction (e.g., fetch event 731 by fetching the PC of the branch), against the branch address in the BCT. When a branch is observed, its status may be updated in the branch status table 728. As described herein, the producer side 716, via the backslice issue unit 718, may issue backslices to the original processor core 702 so that the branch outcomes can be produced. The original processor core (or the additional processor core as the case may be) may execute the received instruction sequence 734 and issue backslice outcome 735. The branch outcomes may then be stored at the branch outcomes table. The branch resolution unit 722 may resolve or obtain the direction of a branch based on one or more of: the fetch event 731, the branch outcome table 720 and the branch status table 728 as illustrated.

Figure 8:
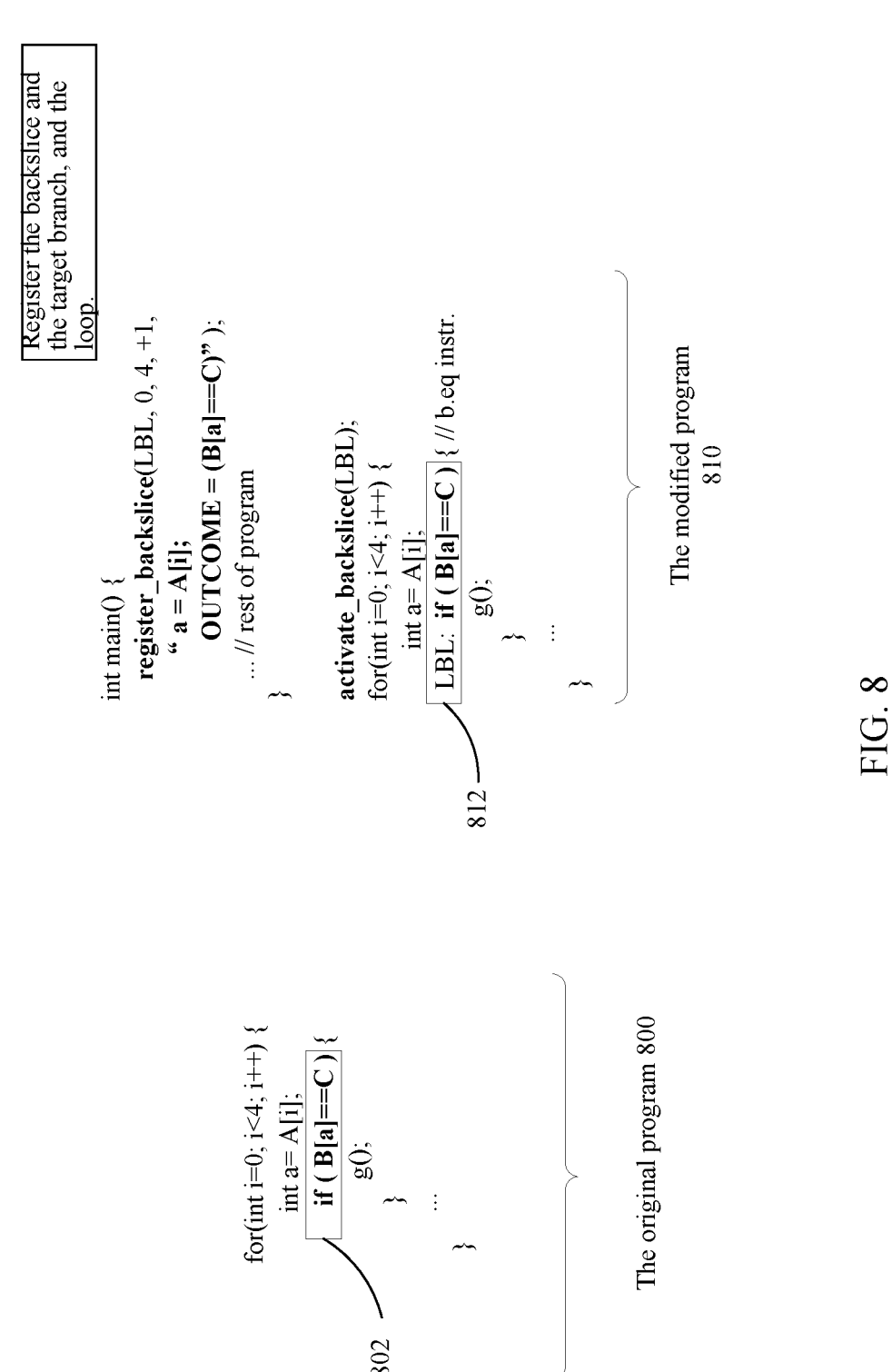
FIG. 8 illustrates a code modification of a HPB within a loop, according to an aspect.

The operation of the software-provided hardware-managed backslice execution (referring to FIG. 5 and FIG. 7) may further be described in the case where the target branch is within a loop, as illustrated in FIG. 8.

When the HPB (hard-to-predict branch) is within a loop, the information of the loop iteration-counter can also be passed to the hardware for an enhancement: the branch-outcome can be pre-computed for future iterations of the loop. FIG. 8 illustrates a code modification of a HPB within a loop, according to an aspect. The original program 800 includes the HPB 802 within a for loop. The original program 800 may be modified to the modified program 810 when passing to the HW 530. Compared to the registration operation of FIG. 6, the registration operation now has three additional elements: the initial-value, the end-value, and the increment of the loop counter; i.e., 0, 4, and +1 respectively in this example. This is illustrated in the register_backslice function of FIG. 6, where the backslice and the target branch is registered: register_backslice (LBL, "a=A[i]; OUT-COME=(B[a]==C)"). Whereas in FIG. 8, the backslice, the target branch, and the loop is registered: register_backslice (LBL, 0, 4, +1, "a=A[i]; OUTCOME=(B[a]==C)").

In the case of a non-loop HPB, e.g., program 600 and the modified program 610, the BCT 710 may comprise information on the backslice and the target branch. In the case of HPB within a loop, e.g., program 800 and the modified program 810, the BCT may include information on the loop (e.g., the initial value, the end value and the increment) in addition to information on the backslice and the target branch.

According to an aspect, the operation of the SW-HW system (e.g., the software-provided hardware managed backslice execution system) described in reference to FIG. 5 and FIG. 7 may be described in the case of a HPB within a loop.

According to an aspect, the BCT 710 may be programmed through a registration operation (e.g., registration operations 510) by the software, as described herein, the CAP fronted 704 may be involved in the registration operation. The backslice may be activated through an activation operation by software (e.g., described in reference to software notifying HW that a target branch will be fetched soon 506, thereby enabling backslice at the HW. An alternative in-hardware mechanism may as used for the activation operation as described herein.

At this point, the values of the primary-input registers of the backslice may be copied from the host processor core to the BCT 700, so that they are used in the executions of the backslice.

According to aspect, the backslice issue unit 718 may start to issue one or more instances of the backslice for future iterations of the loop. The value of the loop counter may be one of the inputs to the backslice and is, thus, set appropriately by the backslice-issue unit to cover all intended iterations of the loop. All other primary inputs to the backslice may be read from the copy operation performed previously, whose values are kept in the BCT 710. Accordingly, each issued instance of the backslice may correspond to one iteration of the loop. This iteration-number information may be kept in the branch-outcomes table 720 along with the corresponding branch-outcome when the issued backslice (e.g., instruction sequence to execute 734) finishes execution and its computed outcome (e.g., backslice outcome (taken/not take) 735) is returned.

The branch-status table 728 may be for "monitoring" the branch, whereas the branch-outcomes table 720 may be for "storing the outcomes" that have been produced, but not yet consumed. Each of the tables 728 and 720 may have an "iteration number" that gets updated differently as described herein. Every issued-backslice may correspond to one iteration-number (referring to the branch outcome table 720). Thus, when the branch-outcome is computed by running the backslice, this <iteration-number, outcome> pair can be stored in the branch-outcomes table 720.

In parallel with the producer side, the branch-monitoring unit 726 on the consumer side 724 may start monitoring the target branch and keep track of the iteration-number for the next fetched instance of the target branch in the branch-status table 728 as follows. For each fetch 731 of the branch instruction, the iteration-number may be incremented. For each squash of the branch instruction, the iteration-number may be decremented or decreased. For each commit of the branch instruction, the corresponding branch-outcome may be removed from the branch-outcomes table 720.

In some aspects, for each fetch 731 of the target branch, the branch-outcomes table 720 may be consulted by the branch-resolution unit 722 to see if a branch-outcome was already produced for that instance of the branch. If positive (i.e., a branch-outcome was already produced for that instance of the branch) that outcome may be read and passed to the mux 714 to be used as the branch-direction 736 by the processor frontend.

In the case of a non-loop HPB, the operation of the SW-HW system may be viewed as a special case of a single-iteration loop.

According to an aspect, the SW-HW may be modified to address one or more potential challenges that may occur during operation. One such challenge may be the skipping of one or more loop iterations, which may happen when some iterations of the loop are skipped by, for example, a "continue" statement in the loop as shown in FIG. 9A. If this happens before the target-branch is reached in the loop body, the iteration number could become incorrect on the consumer side for next instances, and thus would impact performance. FIG. 9A illustrates a code including a "continue" statement, according to an aspect. In the code 900, the "continue" statement 902 appears before the target branch 904, and thus the "continue" statement is executed before reaching the target branch. The "continue" statement may be a control flow statement used in loops (such as "for" or "while" loops) to skip the rest of the current iteration and move on to the next iteration. When the execution encounters a "continue" code 902 it immediately jumps back to the loop's condition check or increment statement, bypassing any code that follows it within the loop block, including the target branch 904. As a result, subsequent code (including the target branch 904) within the loop is effectively skipped for that particular iteration.

According to an aspect, once a new iteration of the loop starts, the consumer-side iteration-number may be incremented to address the skipping of loop iteration challenge. In an embodiment, for identifying a new iteration of a loop, the PC of an instruction that is always executed in all iterations of the loop, which may referred to as loop-iteration-indicator-PC, is also passed from SW to HW through same register_backslice( ) operation. There may be multiple methods for updating this loop-iteration-indicator-PC, e.g., the loop-end-check instruction or loop-counter-updater instruction. According to an aspect, this loop-iteration-indicator-PC may also be monitored by the branch-monitoring unit 726 and accordingly the consumer-side iteration-number (in the branch status table 728) may be updated.

For example, FIG. 9B illustrates how a loop-iteration-indicator-PC may address the issue of skipping loop iterations caused by a "continue" statement 902. FIG. 9B illustrates a loop-iteration-indicator-PC, according to an aspect. The code 910 may be similar to the code 900 with the addition the statement 910, which refers to a loop-iteration-indicator-PC. The statement 910 "A[i]=0" is always executed for all iterations of the loop since it is before the "continue" statement 912. Whereas, the hard-to-predict branch 914 may or may not be executed since it is after the "continue" statement 912. Thus, the execution of the instruction that implements "A[i]=0" may correspond to the execution of one iteration of the loop. Therefore, the PC of that instruction 916 can be passed to HW to be used as an indicator. The HW may monitor that PC, and if a fetch from that PC is observed, this means that a next iteration of the loop has started.

Another potential challenge that may occur during operation may be an early exit from the loop. An early exit from the loop may happen when the loop is prematurely terminated by, for example, a return or break statement in the loop. FIG. 10 illustrates a code including a "break" statement, according to an aspect. The code 1000 includes a "break" statement 1002. The "break" statement 1002 may terminate the loop execution and exit the loop entirely. This means that the target branch 1004 and any subsequent iterations or code within the loop will not be executed. This can result in skew on the consumer side 724 since the target branch is not executed for the remaining iterations of the loop. As a result, the target branch outcomes may not be determined for the unexecuted iterations of the loop. Another concern may be correctness issue for when next time the loop is again fetched, e.g., due to an outer loop. The outcomes produced for previous round should be evicted before the new round begins.

According to an aspect, a generation-number may be used to inhibit or prevent the incorrect consumption of outcome(s) of an earlier generation for a current generation. According to an aspect, every time the loop is reached in the outer loop, a new generation starts and the generation-number is incremented. This generation-number may also be saved in the branch-outcomes table 720 for each branch-outcome. This may allow to differentiate among multiple generations being processed at the same time, which may occur as a result of large instruction-window of the processor happening to cover multiple generations of the loop at the same time.

Another potential challenge that may occur during operation may be rate-synchronization between the producer side 716 and the consumer side 724 of the branch-outcomes. The rate-synchronization may affect the achievable gain. Referring to the producer side 716, going too slow obviously fails to resolve some instances of the branch, and going too fast consumes unnecessarily excessive resources. According to an aspect, the backslice-issue unit 718 may control the rate-synchronization to ensure that the producer side and the consumer side are in sync. The backslice-issue unit 718 may issue the backslice only X iterations ahead. Thus, when iteration number N of the loop is fetched, backslice-issue unit issues the compute for iteration number N+X. (when N+X is beyond the end-value of the loop, the backslice issuance is stopped)

There may be other methods, as known by persons skilled in the art, to ensure that the rate of slice issuance by producer side and the rate of slice consumption by the consumer side are managed. For example, a flow control mechanism may be implemented to regulate the rate of instruction production and consumption. This can involve using signaling or feedback between the producer and consumer to adjust their respective rates. For example, the producer can wait for acknowledgment or signals from the consumer before producing more instructions, ensuring a balanced flow.

Another example may be introducing a throttling mechanism to limit the rate at which the producer generates instructions. This can be achieved by setting specific limits or thresholds on the producer's production rate, ensuring that it doesn't exceed the capacity or processing speed of the consumer. Another approach for managing the slice issuance and consumption may be to establish synchronization signals or markers that allow the producer and consumer to coordinate their actions. These signals can indicate when the consumer is ready to receive new instructions or when the producer should pause or slow down its production.

Another approach to manage the slice issuance and consumption may be to implement adaptive strategies that dynamically adjust the production and consumption rates based on the system's performance and load. This can involve monitoring the buffer levels, processing times, and other relevant metrics to dynamically optimize the synchronization between the producer and consumer sides. Yet another approach can be monitoring the buffer or queue where the producer places instructions. By monitoring the buffer occupancy or level, the producer can regulate its production rate to maintain an optimal balance between generating instructions and the capacity of the buffer or the consumer.

According to an aspect, the formula for branch-outcome (of a HPB) may be identified offline and presented to the hardware without requiring online monitoring and deduction. As a result, run-time overhead (instruction, time, energy) for monitoring and inference may be avoided. Further, a high confidence in correctness of the formula may be obtained, which may allow to pre-execute more aggressively.

According to an aspect, software may inform hardware when to perform one or both of activating the pre-execute and deactivating the pre-execute. As a result, energy may be saved since the HW part can be disabled outside the required region.

According to an aspect, the hardware may decide whether to engage the mechanism (e.g., to pre-execute according to one or more aspects). For example, if conventional predictors are, for any reason, doing a good job on the target branch, activating the pre-execute may be unnecessary. HW may appropriately decide to activate the pre-execute based on known information (e.g., the misprediction rate of target branch).

According to an aspect, in loop cases, hardware may decide how deeply into future iterations of the loop to engage the mechanism. In loop-based cases, the SW may indicate the trip-count of the loop to the HW. Moreover, the HW may have knowledge of the status of the pipeline in terms of idle cycles. Thus, the HW can decide to use those idle cycles or even prioritize backslices over ordinary program, for pre-execution for deeper future iterations of the loop.

As may be appreciated, there are known technical solutions for HW to decide the depth. For example, HW may start from a shallow (or pre-determined) depth and then monitor if the produced branch-outcome is late (i.e., the target branch is fetched before its branch-outcome is produced), and if so, then HW may increase the depth.

According to an aspect, the skipping of loop iteration challenge may be addressed via a loop-iteration-indicator-PC as described herein. Without managing or addressing the skipping of loop iteration challenge, the pre-computed branch-outcomes may not properly map to their corresponding dynamic instances of the branch, and thus the pre-execute mechanism may not achieve desired outcome.

According to an aspect, the early-exit from a loop (an inner loop) challenge may be addressed via a generation number as described herein. Early-exit from a loop may skew production and consumption and result in inadequate performance of the pre-execute mechanism. One or more aspects may provide for using a generation-number to monitor and track the exiting of the loop.

Figure 11:
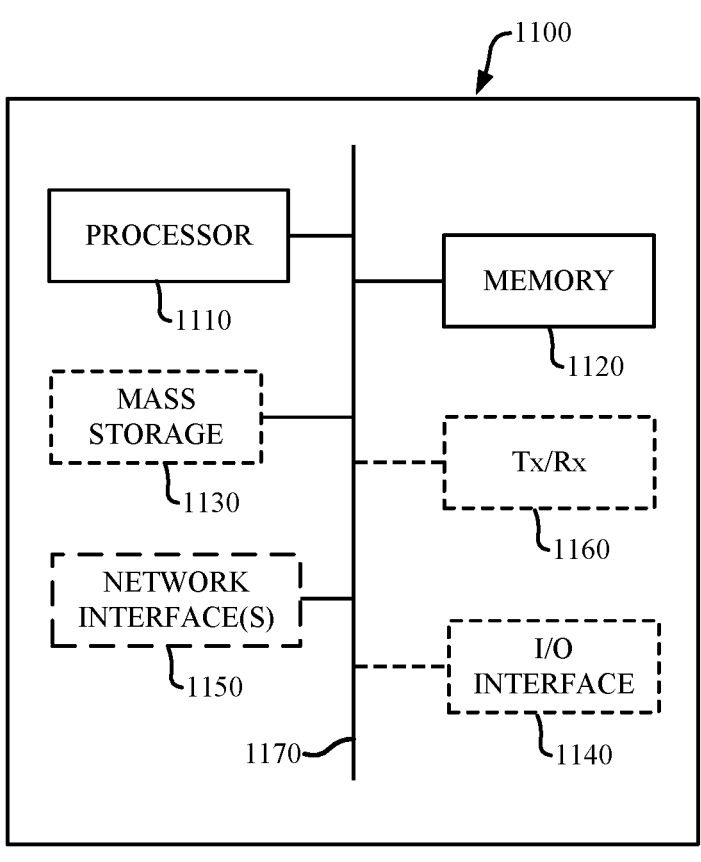
FIG. 11 illustrates an apparatus that may perform any or all of operations of the above methods and features explicitly or implicitly described herein, according to different aspects of the present disclosure.

FIG. 11 illustrates an apparatus 1100 that may perform any or all of operations of the above methods and features explicitly or implicitly described herein, according to different aspects of the present disclosure. For example, a computer equipped with network function may be configured as the apparatus 1100. In some aspect, apparatus 1100 can be a device that connects to the network infrastructure over a radio interface, such as a mobile phone, smart phone or other such device that may be classified as user equipment (UE). In some aspects, the apparatus 1100 may be a Machine Type Communications (MTC) device (also referred to as a machine-to-machine (m2m) device), or another such device that may be categorized as a UE despite not providing a direct service to a user. In some aspects, apparatus 1100 may be used to implement one or more components, systems, mechanisms according to one or more aspects described herein. In some embodiments, the apparatus 1100 may implement one or more of: the SW 520, the ISA extension 540, the HW 530 or 700, the SF-HW system described in reference to FIG. 5 as appreciated by a person skilled in the art.

As shown, the apparatus 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. Transceiver 1160 may include one or multiple antennas According to certain aspects, any or all of the depicted elements may be utilized, or only a subset of the elements. Further, apparatus 1100 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

The memory 1120 may include any type of non-transitory memory such as static random-access memory (SRAM), dynamic random-access memory (DRAM), synchronous DRAM (SDRAM), read-only memory (ROM), any combination of such, or the like. The mass storage element 1130 may include any type of non-transitory storage device, such as a solid-state drive, hard disk drive, a magnetic disk drive, an optical disk drive, USB drive, or any computer program product configured to store data and machine executable program code. According to certain aspects, the memory 1120 or mass storage 1130 may have recorded thereon statements and instructions executable by the processor 1110 for performing any method operations described herein.

The processor 1110 and memory 1120 may function together as a chipset which may be provided together for installation into wireless communication apparatus 1100 in order to implement WLAN functionality. The chipset may be configured to receive as input data including but not limited to PPDUs from the network interface 1150. The chipset may be configured to output data including but not limited to PPDUs to the network interface 1150.

Figure 12:
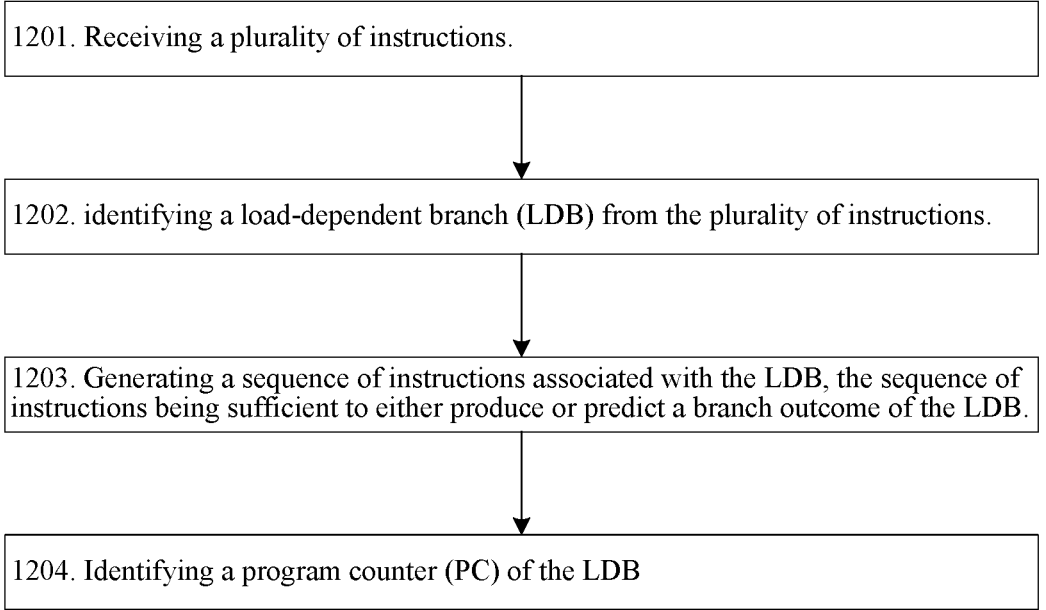
FIG. 12 illustrates a method according to an aspect.

FIG. 12 illustrates a method according to an aspect. The method 1200 may be performed by a compiler. The method 1200 may include receiving 1201 a plurality of instructions. The method may further include identifying 1202 a load-dependent branch (LDB) from the plurality of instructions. The method may further include generating 1203 a sequence of instructions associated with the LDB, the sequence of instructions being sufficient to either produce or predict a branch outcome of the LDB. The method may further include identifying 1204 a program counter (PC) of the LDB.

Figure 13:
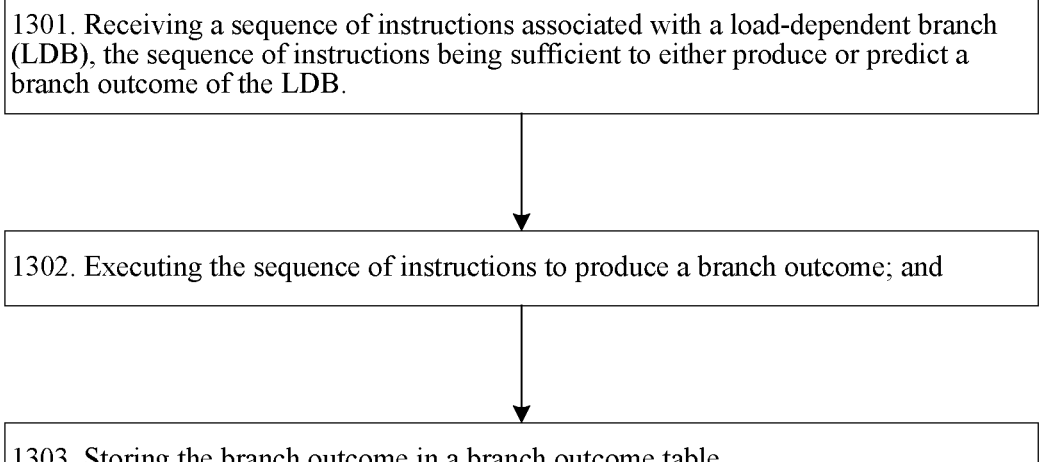
FIG. 13 illustrates a method of performing branch prediction in a processor, according to an aspect.

FIG. 13 illustrates a method of performing branch prediction in a processor. The method 1300 may include receiving 1301 a sequence of instructions associated with a load dependent branch (LDB). The sequence of instructions may be sufficient to either produce or predict a branch outcome of the LDB. The method may further include executing 1302 the sequence of instructions to produce a branch outcome. The method may further include storing 1303 the branch outcome in a branch outcome table.

The method 1300 may further include receiving execution limits of the sequence of instructions. Executing the sequence of instructions to produce a branch outcome may include executing the sequence of instructions based on the execution limits to produce a plurality of branch outcomes. One of the plurality of branch outcomes may be produced each time the sequence of instructions is executed. Storing the branch outcome in a branch outcome table may include storing the plurality of branch outcomes in the branch outcome table.

The method 1300 may further include executing a plurality of instructions, the plurality of instructions including the LDB. The method 1300 may further include receiving an indication that the LDB will be executed, the indication being received sufficiently in advance of the execution of the LDB to allow the execution of the sequence of instructions. Executing of the sequence of instructions may be initiated in response to receiving the indication.

The method 1300 may further include receiving a program counter (PC) of the LDB. The method may further include executing a plurality of instructions, the plurality of instructions including the LDB. The method 1300 may further include monitoring the execution of the plurality of instructions being executed by the processor to detect the execution of the LDB as indicated by the PC. The method may further include executing the LDB.

Executing the LDB may include determining whether to utilize one of the plurality of branch outcomes or to utilize the output of a branch prediction unit. Executing the LDB may include determining to use the one of the plurality of branch outcomes. The one of the plurality of branch outcomes is when executing the LDB based on a history of mispredictions of the branch prediction unit.

Executing the LDB may include determining to use the branch prediction unit when executing the LDB. The LDB is part of a loop of the plurality of instructions and the execution limits include limits of the loop.

Figure 14:
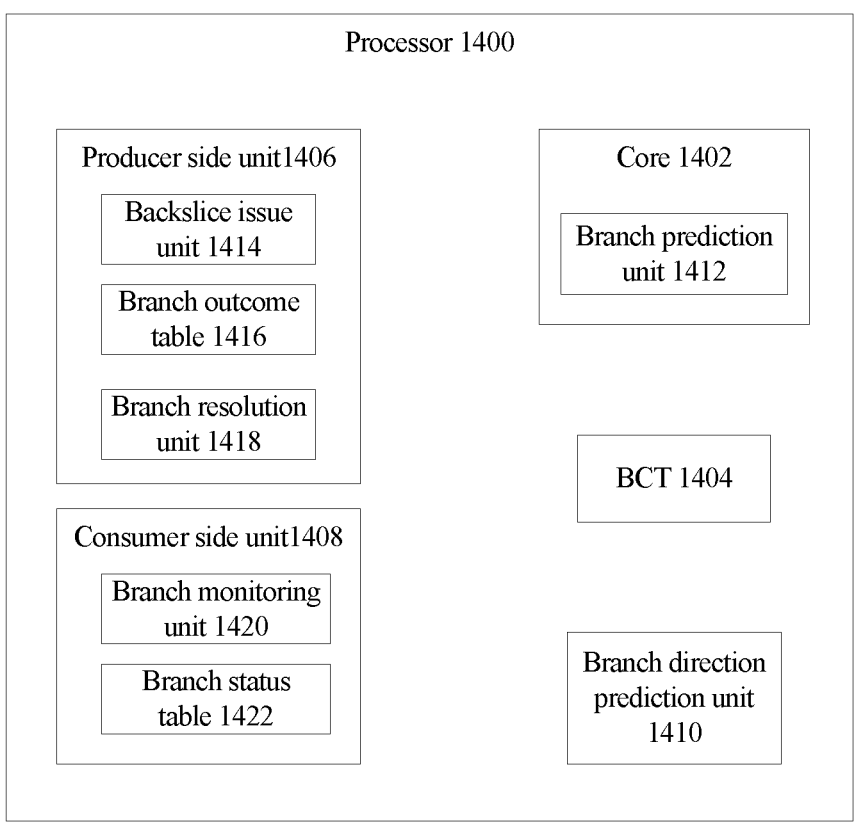
FIG. 14 illustrates block diagram of a processor, according to an aspect.

FIG. 14 illustrates block diagram of a processor, according to an aspect. The processor 1400 may include a core 1402 configured to execute a plurality of instructions. The processor may further include a backslice configuration table (BCT) 1404 (similar to BCT 710) configured to store an input register value of a branch outcome of a load-dependent branch (LDB). The processor may further include a producer side unit 1406 (similar to producer side 716) configured to supply the core with a backslice to be executed by the core. The backslice may be derived from the LDB and supplied to the core prior to execution of the LDB. The producer side unit 1406 may further be configured to receive the branch outcome of the LDB produced by the core executing the backslice. The processor may further include a consumer side unit 1408 (similar to consumer side 724) configured to monitor execution of the LDB associated with the backslice. The processor may further include a branch direction prediction unit 1410 configured to supply to the core, the branch outcome.

The core may include a branch prediction unit 1412. The branch direction prediction unit 1412 may further be configured to receive a branch prediction and be configured to supply the core with the branch prediction or the branch outcome. The input register value may be used in the execution of the backslice by the core.

The producer side unit 1406 may include a backslice issue unit 1414 (similar to backslice issue unit 718) configured to supply the core with the backslice. The producer side unit 1406 may further include a branch outcomes table 1416 (similar to branch outcomes table 720) configured to receive the branch outcome of the LDB produced by the core. The producer side unit 1406 may further include a branch resolution unit 1418 (similar to branch resolution unit 722) configured to determine if the branch outcome is supplied to the core or a branch prediction of a branch prediction unit 1412 of the core 1402 should be supplied to the core.

The consumer side unit 1408 may include a branch monitoring unit 1420 (similar to branch monitoring unit 726) configured to monitor execution of the LDB associated with the backslice. The consumer side unit 1408 may further include a branch status table 1422 (similar to branch status table 728) configured to store a status of the LDB. The status may include one of a fetch status, a squash status, and a commit status.

The backslice may be associated with a loop included in the plurality of instructions. The producer side unit may further be configured to supply the processor core with a value of a loop counter of the loop. The producer side unit may further be configured to store the values of the loop counters associated with each of the plurality of branch outcomes. Each execution of the backslice may correspond to an iteration of the loop.

The backslice may be associated with a loop included in the plurality of instructions. The consumer side unit may further be configured to monitor an iteration number of the execution of the LDB such that for each fetch of the LDB the iteration number is incremented, for each squash of the LDB the iteration number is decremented, and for each commit of the LDB the iteration number the branch outcome is removed from a branch outcome table of the producer side unit.

According to an aspect, a method at the hardware 530 may be provided. The method may refer to messages sent across the ISA extension 540 for example. The method may include receiving instructions associated with a code to pre-execute before executing the code. The instructions may include a program counter (PC) value of a target branch of the code. The instructions may further include backslice information associated with the target branch and comprising compute instructions (e.g., branch outcome formula) for generating an outcome of the target branch. The instructions may further include a PC value of the compute instructions. The method may further include sending a second set of instructions (e.g., referring to the dispatching 512 of slices) including the compute instructions to generate the outcome of the target branch, the second set of instructions being based on the received instructions. In some embodiments, the sending of the second set of instructions may be done selectively.

The method may further include receiving further instructions indicating that the target branch will be part of the forthcoming instructions (e.g., referring to enabling 511 backslice operations). The method may further receiving further instructions indicating release of resources associated with a region of the code involving the target branch.

The target branch may be within a loop in the code, the back slice information further comprising control variables of the loop including one or more of: an initial-value of a loop counter of the loop, an end-value of the loop counter, and an increment value of the loop counter.

The method may further include storing the instructions in a backslice configuration table (BCT) 710. The method may further include obtaining the generated outcome 735 of the target branch. The method may further include storing the generated outcome in a branch outcome table 720. The method may further include generating a prediction 736 of the target branch based on the generated outcome.

Sending the second set of instructions including the compute instructions comprises sending one or more compute instructions for computing one or more outcomes corresponding to one or more iterations of the target branch based on the loop and the control variables.

The method may further include storing the instructions in a backslice configuration table (BCT) 710. The method may further include obtaining the one or more outcomes 735 corresponding to the one or more iterations of the target branch. The method may further include storing the one or more outcomes in a branch outcome table 720.

The method may further include monitoring (e.g., via a branch monitoring unit 726) the one or more iterations of the target branch being fetched (e.g., fetch event 731) for execution. For each iteration of the monitored one or more iterations of the target branch, updating the loop counter in a branch status table 728.

The method may further include, for each iteration of the monitored one or more iterations of the target branch, generating a corresponding prediction for said iteration based on one or more of: the loop counter corresponding to said iteration; and an outcome of the one or more outcomes, the outcome corresponding to said iteration.

According to another aspect, a method may be provided. The method may include receiving instructions (e.g., referring to issued or dispatched 512 slices in FIG. 5, and the instruction sequence to execute 734 in FIG. 7) to execute a target branch of a code, the instructions comprising compute instructions for computing an outcome 735 of the target branch. The method may further include executing the compute instructions to generate the outcome 735. The method may further include receiving a prediction 736 for the target branch based on the generated outcome.

The target branch may be within a loop in the code. The compute instructions may be for computing one or more outcomes corresponding to one or more iterations of the target branch, the one or more iterations of the target branch being based on control variables of the loop comprising one or more of: a loop counter, an initial value of the loop counter, an end-value of the loop counter, an increment value of the loop counter.

Executing the compute instructions to generate the outcome 735 comprises executing the one or more iterations of the target branch to generate the one or more outcomes 735. Receiving a prediction for the target branch comprises receiving one or more predictions 736 based on the generated one or more outcomes.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of performing branch prediction in a processor, the method comprising:
   receiving a compiler-generated backslice, the backslice comprising a sequence of instructions associated with a load-dependent branch (LDB), the sequence of instructions being sufficient to either produce or predict a branch outcome of the LDB, the compiler-generated backslice being pre-defined by a compiler;
   executing the compiler-generated backslice to produce a branch outcome; and
   storing the branch outcome in a branch outcome table.

2. The method of claim 1 further comprising:
   receiving execution limits of the sequence of instructions; wherein:
   executing the compiler-generated backslice to produce the branch outcome comprises:
      executing the compiler-generated backslide based on the execution limits to produce a plurality of branch outcomes, one of the plurality of branch outcomes produced each time the sequence of instructions is executed; and
      storing the branch outcome in a branch outcome table comprises:
         storing the plurality of branch outcomes in the branch outcome table.

3. The method of claim 2 further comprising:
   executing a plurality of instructions, the plurality of instructions including the LDB;

receiving an indication that the LDB will be executed, the indication being received sufficiently in advance of the execution of the LDB to allow the execution of the sequence of instructions; and
   wherein the executing of the sequence of instructions is initiated in response to receiving the indication.

4. The method of claim 2 further comprising:
   receiving a program counter (PC) of the LDB;
   executing a plurality of instructions, the plurality of instructions including the LDB;
   monitoring the execution of the plurality of instructions being executed by the processor to detect the execution of the LDB as indicated by the PC; and
   executing the LDB.

5. The method of claim 4 further wherein executing the LDB includes determining whether to utilize one of the plurality of branch outcomes or to utilize the output of a branch prediction unit.

6. The method of claim 5 wherein executing the LDB includes determining to use the one of the plurality of branch outcomes.

7. The method of claim 6 wherein the one of the plurality of branch outcomes is when executing the LDB based on a history of mispredictions of the branch prediction unit.

8. The method of claim 5 wherein executing the LDB includes determining to use the branch prediction unit.

9. The method of claim 2 wherein the LDB is part of a loop of the plurality of instructions and the execution limits include limits of the loop.

10. A processor comprising:
   a core configured to execute a plurality of instructions;
   a backslice configuration table (BCT) configured to store an input register value of a branch outcome of a load-dependent branch (LDB);
   a producer side unit configured to supply the core with a backslice to be executed by the core, the backslice being derived from the LDB and supplied to the core prior to execution of the LDB, the producer side unit further configured to receive the branch outcome of the LDB produced by the core executing the backslice;
   a consumer side unit configured to monitor execution of the LDB associated with the backslice; and
   a branch direction prediction unit configured to supply to the core, the branch outcome.

11. The processor of claim 10 wherein the core includes a branch prediction unit, the branch direction prediction unit further configured to receive a branch prediction and be configured to supply the core with the branch prediction or the branch outcome.

12. The processor of claim 10 wherein the input register value is used in the execution of the backslice by the core.

13. The processor of claim 10 wherein the producer side unit comprises:
   a backslice issue unit configured to supply the core with the backslice;
   a branch outcomes table configured to receive the branch outcome of the LDB produced by the core; and
   a branch resolution unit configured to determine if the branch outcome is supplied to the core or a branch prediction of a branch prediction unit of the core should be supplied to the core.

14. The processor of claim 10 wherein the consumer side unit comprises:
   a branch monitoring unit configured to monitor execution of the LDB associated with the backslice; and a branch status table configured to store a status of the LDB, the status including one of a fetch status, a squash status, and a commit status.

15. The processor of claim 10 wherein the backslice is associated with a loop included in the plurality of instructions, the producer side unit further being configured to supply the processor core with a value of a loop counter of the loop, the producer side unit further configured to store the values of the loop counters associated with each of the plurality of branch outcomes, wherein each execution of the backslice corresponds to an iteration of the loop.

16. The processor of claim 10 wherein the backslice is associated with a loop included in the plurality of instructions, the consumer side unit further configured to monitor an iteration number of the execution of the LDB such that for each fetch of the LDB the iteration number is incremented, for each squash of the LDB the iteration number is decremented, and for each commit of the LDB the iteration number the branch outcome is removed from a branch outcome table of the producer side unit.

17. A processor configured to:

receive a compiler-generated backslice, the backslice comprising a sequence of instructions associated with a load-dependent branch (LDB), the sequence of instructions being sufficient to either produce or predict a branch outcome of the LDB, the compiler-generated backslice being pre-defined by a compiler;

execute the compiler-generated backslice to produce a branch outcome; and store the branch outcome in a branch outcome table.

\* \* \* \* \*